(12) United States Patent
Braband

(10) Patent No.: US 12,711,202 B2
(45) Date of Patent: Aug. 18, 2026

(54) COMPUTER-IMPLEMENTED METHOD AND DEVICE FOR EVALUATING A DATASET BASED ON A RANGE OF UNCERTAINTY

(71) Applicant: SIEMENS MOBILITY GMBH, Munich (DE)

(72) Inventor: Jens Braband, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/613,245

(22) Filed: Mar. 22, 2024

(65) Prior Publication Data

US 2024/0320307 A1 Sep. 26, 2024

(30) Foreign Application Priority Data

Mar. 22, 2023 (EP) .................................... 23163429

(51) Int. Cl.
*G06F 18/23213* (2023.01)
*B61L 23/00* (2006.01)

(52) U.S. Cl.
CPC ........ *G06F 18/23213* (2023.01); *B61L 23/00* (2013.01)

(58) Field of Classification Search
CPC ............. G06F 18/23213; G06F 18/214; G06F 18/217; G06F 18/24; B61L 23/00; G06N 3/02; G06N 3/088; G06N 20/00
See application file for complete search history.

(56) References Cited

FOREIGN PATENT DOCUMENTS

CN 114091579 A * 2/2022

OTHER PUBLICATIONS

Braband, J., & Schäbe, H. (2020). On safety assessment of artificial intelligence. arXiv preprint arXiv:2003.00260. (Year: 2020).*
Braband, Jens et al: "On Safety Assessment of Artificial Intelligence", arxiv.org, Cornell University Library, 201 Olin Library Cornell University Ithaca, NY 14853, Feb. 29, 2020 (Feb. 29, 2020), XP081611032.

* cited by examiner

*Primary Examiner* — Aleksandr Kerzhner
*Assistant Examiner* — Samuel C Sharpless, III
(74) *Attorney, Agent, or Firm* — Laurence A. Greenberg; Werner H. Stemer; Ralph E. Locher

(57) ABSTRACT

A computer-implemented method for evaluating a dataset. The dataset is generated by a physical process. According to the method, the dataset has a) a plurality of first data points, which can be assigned to a first label, wherein the first data points at least partially form at least one first local cluster area, and b) a plurality of second data points, which can be assigned to a second label and the second data points at least partially form at least one second local cluster area. The first data points and the second data points are separable. Creating a range of uncertainty at least between the first cluster area of the first data points and the second cluster area of the second data points; and evaluating the dataset based on the range of uncertainty so created.

20 Claims, 3 Drawing Sheets

100
101
102
U
W
L

COMPUTER-IMPLEMENTED METHOD AND DEVICE FOR EVALUATING A DATASET BASED ON A RANGE OF UNCERTAINTY

CROSS-REFERENCE TO RELATED APPLICATION

This application claims the priority, under 35 U.S.C. § 119, of European patent application EP 23163429, filed Mar. 22, 2023; the prior application is herewith incorporated by reference in its entirety.

FIELD AND BACKGROUND OF THE INVENTION

The invention relates to a computer-implemented method for evaluating a dataset, which relates to a physical process, in particular in the rail transportation technology sector. Furthermore, the invention relates to a data processing apparatus and a computer program product.

The invention can hence relate to the technical field of the evaluation of datasets, in particular with regard to rail transportation technology.

A plurality of technical functions and physical processes can be described by way of datasets. Artificial intelligence (AI) algorithms or machine learning (ML) algorithms (hereinafter, ML is considered a form of AI) are used more and more frequently to evaluate (but also to create) these datasets. Accordingly, such algorithms should also be considered for safety applications, for example in the rail transportation technology sector. However, especially in this sector, the safety requirements are particularly high for understandable reasons.

At present, it is still challenging to use an AI algorithm for safety applications, since known algorithms (substantially) do not achieve a corresponding safety certification. However, here it could be particularly advantageous to evaluate the datasets (or even the training datasets) so that meaningful evidence of accuracy or misclassification would be available.

However, conventionally, substantially only purely statistical approaches are available for this purpose. The correspondingly determined probabilities (and thresholds) for misclassification errors are currently too imprecise to be of practical use since they only converge with the rate $\sqrt{n}$ (the rate n would be desirable) (when n is the number of data points). However, these previous estimates do not utilize the properties of the respective problem, such as, for example, distribution shapes, or make any particular assumptions regarding the problem. One consequence of this would be to adapt or lower the safety standards for AI applications. This may not be desirable, however, with regard to safety risks.

The document "JENS BRABAND ET AL: "On Safety Assessment of Artificial Intelligence", ARXIV.ORG, CORNELL UNIVERSITY LIBRARY, 201 OLIN LIBRARY CORNELL UNIVERSITY ITHACA, NY 14853, Feb. 29, 2020 (2020-02-29), XP081611032" discusses how systems with artificial intelligence (AI) can be subjected to a safety assessment.

SUMMARY OF THE INVENTION

It is accordingly an object of the invention to provide a method for evaluating a dataset which overcomes a variety of disadvantages of the heretofore-known devices and methods of this general type and which provides for a method to evaluate a dataset in an efficient and reliable way.

With the above and other objects in view there is provided, in accordance with the invention, a computer-implemented method comprising:

performing a physical process and acquiring data from the physical process;

creating a dataset based on the physical process;

evaluating a probability of a misclassification of the dataset by the following steps:

providing the dataset, which includes:

- a plurality of first data points, which can be assigned to a first label, wherein the first data points at least partially form at least one first local cluster area; and
- a plurality of second data points, which can be assigned to a second label, wherein the second data points at least partially form at least one second local cluster area; and
- wherein the first data points and the second data points are separable;

establishing a range of uncertainty between the first local cluster area of the first data points and the second local cluster area of the second data points; and evaluating the dataset based on the range of uncertainty by determining a limit range of the range of uncertainty based on a stochastic distribution.

The above and other objects of the invention are achieved by the novel method, a data processing apparatus and a computer program product, as described below.

According to a first aspect of the invention, a (computer-implemented) method is described for the evaluation (assessment, checking, in particular the probability of misclassification) of a dataset. The method comprises:

i) providing the dataset, which relates to a technical/physical process or was generated means of a technical/physical process (for example, acquiring and/or simulating signals from rail transportation technology), and has:

a) a plurality of first data points, which can be assigned to a first label (or marking, characteristic, parameter) (for example, red traffic light signal), wherein the first data points (at least partially) form at least one first local cluster area, and b) a plurality of second data points, which can be assigned to a second label (for example, green traffic light signal), wherein the second data points at least partially form at least one second local cluster area, wherein the first data points and the second data points are separable (or do not overlap);

ii) creating a range of uncertainty (for example, an area in the two-dimensional problem space with a length L and a width w or, in the general m-dimensional case, a hypersurface with an (m−1) dimensional volume and a distance) at least between the first local cluster area of the first data points and the second local cluster area of the second data points; and iii) evaluating the dataset based on the range of uncertainty created.

According to a second aspect of the invention, a method is described with the following steps:

i) performing a physical process (for example, acquiring signals), ii) creating a dataset (in particular by means of an artificial intelligence (AI) algorithm based on the physical process, and iii) evaluating the dataset according to the above-described method.

According to a third aspect of the invention, a data processing apparatus is described which comprises at least one processor and is configured to execute the above-described method.

According to a fourth aspect of the invention, a computer program product is described which comprises instructions which, when the program is executed by a computer, cause the computer to execute the above-described method.

In the context of this document, the term "dataset" can in particular relate to a plurality of data items (data points). The data items (for example, signals, time series, etc.) can also be multidimensional. In particular, these data items are related to a technical function or a physical process. In one example, the data items are acquired or measured as part of the physical process. For example, signals are acquired or an axle counter measures the number of axles passing through. In a further example, the dataset is simulated/modeled, but still relates to a technical function, for example the signals or axle progression are simulated. The dataset can be a measurement result or also, for example, verification data or training data.

According to one exemplary embodiment, the invention can be based on the idea that a dataset can be evaluated in an efficient and reliable manner if several assumptions (see below) hold true for the dataset (or the dataset is transformed such that the assumptions hold true) and the evaluation is performed based on a range of uncertainty between (local) cluster areas of data points of the same label.

The assumptions mentioned will be clarified below. Here, n is the size of the dataset (or the number of data points) and m is the dimension of the data items or the number of dimensions of the problem space of the dataset. In particular, the following assumptions are made for the dataset (or should be fulfilled (also by data transformation)):

Assumption A1: the n data points are separated in the m-dimensional space by (m−1) dimensional sets of hyperareas or hyperplanes (L). In a two-dimensional space, for example, the hyperarea would be a length, while the hyperarea in a three-dimensional space would be a surface, for example.

Assumption A2: the hyperarea and/or the limit area (w) (or surface area/surface volume) of the hyperarea (L) can be defined/measured and is finite (in particular no unusual edges such as Mandelbrot (fractals) etc.).

Assumption A3: the data points that can be assigned to a label have a tendency to cluster or form a local cluster area. In other words, a data point of another label (substantially) only occurs in the immediate neighborhood of the separating hyperareas (A3 is hence a consequence of A1).

Assumption A4: in the vicinity of the limit range of the hyperarea, the distribution of the data points is locally homogeneous (by the same continuous distribution F). When x approaches zero, the limit of $F^{-1}(x)$ exists and is finite.

In contrast to known statistical methods, in the present case, the distribution of the data points in the environment (vicinity) of the limit range (of the hyperarea) is considered. This approach can provide a surprisingly efficient evaluation method, which, for example, provides a measure for the reliability of misclassification. In a preferred exemplary embodiment, this is achieved such that rate n is used to converge instead of rate $\sqrt{n}$ (see statistical method above). This is extremely surprising, but it can be justified by the assumptions (A1-A4), which differ from conventional statistical learning theory.

Furthermore, a particular advantage can be that the result is very general and that it could, for example, enable the number of training data items to be significantly reduced.

The following describes exemplary embodiments and implementations of the inventive concepts:

According to one exemplary embodiment, the evaluation comprises: estimating the probability that a data point is assigned to the wrong label. In other words, that one of the first data points is assigned to the second label and/or one of the second data points is assigned to the first label. In a practical example, for example, a red traffic light signal (as the first label) could be confused with or misclassified as a green traffic light signal (as the second label). A misclassification of this kind (for example, by an AI System) would obviously have significant consequences. Therefore, it can be particularly important to determine the probability of misclassification as accurately as possible.

It has surprisingly been shown that the described evaluation method can (at least partially) accomplish this more efficiently and reliably than established statistical methods. In other words, a measure for the probability of misclassification can be determined. Overall, the described evaluation method can be used to efficiently and reliably assess datasets (in particular from the rail transportation sector, where safety requirements play a prominent role), but also training datasets.

According to a further exemplary embodiment, the creation of the range of uncertainty furthermore comprises: determining (defining) of a finite hyperarea (L) of the range of uncertainty. Such a hyperarea exists and can be clearly determined (see assumptions A1 and A2 above) between cluster areas. In the present context, the term "hyperarea" is used to be independent of the number of dimensions of the respective problem space. The term hyperarea substantially refers to a known hyperplane, but is not intended to restrict dimensionality; this depends on the respective problem space of the dataset. While the hyperarea in a two-dimensional problem space would therefore be a length, in a three-dimensional problem space, it would be a surface (i.e., hyperplane or hypersurface), in a four-dimensional problem space, it would be a volume, etc.

In one example, a plurality of established methods can be used to determine the hyperarea, for example Delaunay triangulation, limit (value) search, maximum margin hyperplane, etc. This list of examples is not intended to be exhaustive. As a result, established and efficient methods can be implemented directly.

According to a further exemplary embodiment, the creation of the range of uncertainty furthermore comprises: determining or estimating a limit range (w) of the range of uncertainty (or the hyperarea). In particular, here, the assumption is made that the distribution of the data points in the limit area follows a fixed, but unknown, stochastic distribution. For example, a (upper) quantile of the minimum distance distribution can be estimated as a safety measure. It has surprisingly been shown that such an estimation (based on a stochastic distribution) can function particularly efficiently and reliably. Detailed exemplary embodiments relating to the estimation of the limit range can be found below with reference to FIGS. 2 to 5.

According to a further exemplary embodiment, the dataset originates from the rail transportation technology sector. In particular, the dataset relates to at least one of the following technical functions or physical processes: signals, in particular light signals (further in particular traffic lights), axle counters, point mechanisms. This can have the advantage that datasets relating to economically relevant technical functions, in particular from the railroad sector, can be evaluated/characterized by means of the described method. As already mentioned above, the safety factor is of particular relevance in this sector.

According to a further exemplary embodiment, the dataset comprises at least 100,000 data points, in particular at least 500,000 data points, further in particular at least 1,000,000 data points, further in particular at least 10,000,000 data points. It has surprisingly been shown that the reliability of the evaluation (misclassification) increases enormously with a particularly high n (number of data points).

This can be illustrated by the following example. First, a dataset comprising n=10,000 data points is considered. In statistical learning theory, the limit of the evaluation is in the order of magnitude of 0.01, but with the present method it is in the order of magnitude of 0.0001 (both results would have to be multiplied by an unknown constant in the range of 10-100). However, both can be unusable for safety applications (in the railroad sector). However, if n is now increased to 1,000,000 data points, the result according to statistical learning theory would be in the order of magnitude of 0.001, i.e., still too unreliable for safety applications. However, with the method described, the limit would be in the order of magnitude of 0.000001, as a result of which, this example would already be suitable for basic safety arguments.

According to a further exemplary embodiment, the problem space of the dataset is defined in two or more, three or more, dimensions (m). This can have the advantage that the separation of the data points can be improved. In particular, in some cases, this enables the assumptions to be fulfilled particularly well or a high degree or separability of the data points can be achieved. The presence of local cluster areas can also be improved by this measure.

According to a further exemplary embodiment, the method comprises: reducing the applied dimensions. This can have the advantage that resources (in particular computing power) can be saved. The dimensions of the problem space can be reduced directly by means of established methods, for example principal component analysis. In other words, the dimensionality of the problem (the dimensions of the problem space) is reduced, for example by feature extraction in order to only consider the most important features of the data items.

According to a further exemplary embodiment the method comprises: increasing the applied dimensions. As already explained above, this can improve separability or clustering. This can also be implemented directly by means of established methods for transforming the data (points).

Even in sub-datasets, in some circumstances, it may not be easy to separate the data points. It can be advantageous to transform the data points, in particular in such a way that the number of dimensions is increased. This enables a more efficient separation of the data points to be achieved.

Transformations are known which also enable linear separation, wherein however, additional dimensions have to be introduced. This is known from statistical learning theory, for example, where it is referred to as “the kernel trick.”

According to a further exemplary embodiment, the method comprises: separating at least one sub-dataset (or one sub-space) from the dataset (or the problem space). In one exemplary embodiment, this is in particular performed in such a way that the distribution of the data points in the vicinity of the range of uncertainty is (substantially) locally homogeneous for the sub-dataset.

According to a further exemplary embodiment the method comprises: merging the evaluation of at least two sub-datasets. This enables a reliable overall result to be obtained at the end despite separation.

According to one exemplary embodiment, if at least A1 and A2 apply to the dataset (or are at least plausible), the following steps can be performed, for example:

- if necessary, the problem space of the dataset can be separated into subsets (sub-datasets), to which A4 applies. The number of data points and the empirical distribution is determined for each separated sub-dataset.
- for each sub-dataset (subset), the surface area (the surface volume) L of the limit of the hyperplane and the uncertainty width w can be calculated.
- the sub-dataset information can be collected and summated to obtain the overall result for the entire problem space of the dataset.

According to a further exemplary embodiment, the evaluation comprises: establishing whether the dataset fulfils a predetermined safety criterion, in particular in the rail transportation technology sector. This can have the advantage that a dataset (in particular the probability of misclassification) can be evaluated efficiently and reliably. For this purpose, in particular in the rail transportation technology sector, it can be necessary for the measure of data reliability to be set so high that it cannot be met by conventional statistical methods (see above). However, surprisingly, this can be enabled with the evaluation method described here.

In one exemplary embodiment, a safety requirement of, for example, 10-5 is to be met. This would mean that training and validation results should not have a higher failure rate. Assuming an empirical result $R_{emp}$ is in this order of magnitude. Then, in particular the upper limit $R_{emp}+\Delta$ can be of interest, so that the actual error rate R is below this threshold with a statistical confidence of at least p. Therefore, it may also be necessary to ensure that $R_{emp}+\Delta<s$, so that it is known that the safety requirement is met with a confidence of p. The results for the length of the confidence intervals $\Delta$ can be considered for different approaches if it is assumed that the validation results are adequate.

In this context, the following table compares the described evaluation method with the established statistical approaches Chernoff, normal confidence and Vapnik. With the evaluation method described here, overall results are given because, unlike the case with the other approaches, $\Delta$ cannot be separated.

| n | Chernoff | Normal-confidence | Vapnik | Evaluation method |
|---|---|---|---|---|
| 100,000 | 0.0019 | 0.000025 | 0.029 | 0.00028 |
| 1,000,000 | 0.00059 | 0.000008 | 0.0092 | 0.000028 |
| 10,000,000 | 0.00019 | 0.0000025 | 0.0029 | 0.0000028 |
| 100,000,000 | 0.000059 | 0.0000008 | 0.00092 | 0.00000028 |
| 1,000,000,000 | 0.000019 | 0.00000025 | 0.00029 | 0.000000028 |

According to a further exemplary embodiment, the method comprises the use of an artificial intelligence (AI) algorithm. In the context of this document, the term “AI” can in particular refer to computer-based approaches for mimicking cognitive functions of a human mind, in particular learning and problem-solving. A plurality of different mathematical algorithms and computational models have been developed to implement AI functionalities, for example “machine learning”, “deep learning”, neural networks, genetic algorithms, kernel regression, etc. The main purpose of these can be seen as improving an existing algorithm by training it with training data so that a learning effect occurs, and the algorithm's problem-solving ability improves over time. This can be done with or without human intervention (for example, improvement).

According to a further exemplary embodiment, the dataset (evaluated, in particular considered to be reliable) can be used as training data for an AI algorithm. Training data can be of particular importance in order to enable an acceptable reliability of the algorithm to be trained, in particular an AI algorithm. According to a further exemplary embodiment, the training data is provided to an artificial intelligence (AI) algorithm.

It should be noted that embodiments of the invention have been described with reference to different types of subject matter. In particular, some embodiments have been described with reference to method claims, while other embodiments have been described with reference to apparatus claims. However, a person skilled in the art will understand from the foregoing and the following description that, unless otherwise indicated, in addition to any combination of features belonging to one type of subject matter, any combination of features relating to different types of subject matter is also deemed to be disclosed by this document. This in particular applies to features of the method claims and features of the apparatus claims.

The above-defined aspects and further aspects of the present invention result from the exemplary embodiments described below and will be explained with reference to the exemplary embodiments. The invention is described in more detail below with reference to embodiments to which, however, the invention is not restricted.

Other features which are considered as characteristic for the invention are set forth in the appended claims.

Although the invention is illustrated and described herein as embodied in evaluating a dataset based on a range of uncertainty, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figures 1, 2:
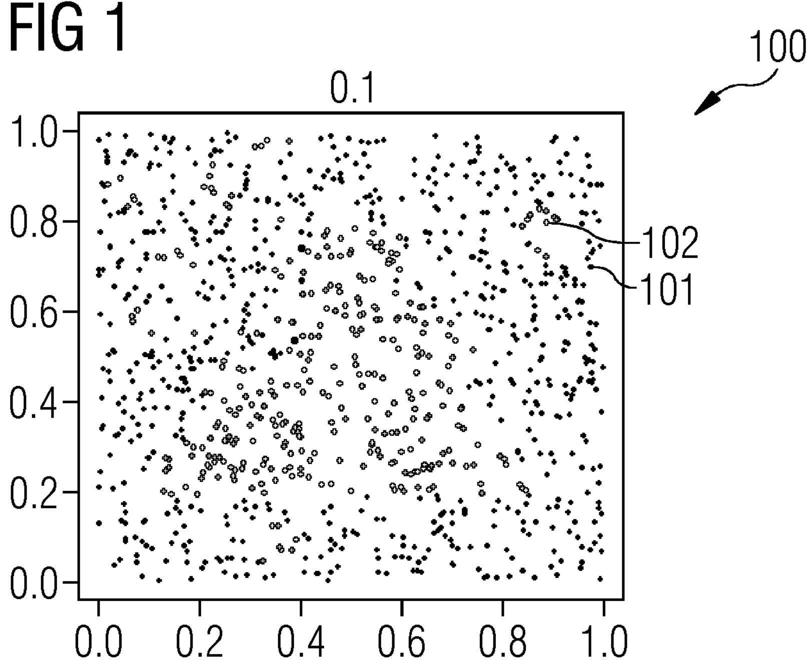
FIG. 1 shows a dataset with first and second data points, which in each case can be assigned to a label according to one exemplary embodiment of the invention.
FIG. 2 shows a range of uncertainty between a first cluster area and a second cluster area according to one exemplary embodiment of the invention.

The depictions in the drawings are schematic. Reference is made to the fact that, in different figures, similar or identical elements or features are provided with the same reference symbols or with reference symbols that only differ from the corresponding reference symbols in the first digit. In order to avoid unnecessary repetition, elements or features that have already been explained in relation to a previously described embodiment are not explained again at a later point of the description.

In addition, spatially relative terms such as "front" and "back," "top" and "bottom," "left" and "right" etc. are used to describe the relationship of one element to another element as depicted in the figures. Thus, the relative spatial terms can apply to orientations used that differ from the orientation shown in the figures. Obviously, these spatially relative terms only refer to a simplification of the description and the orientation shown in the figures and are not necessarily restrictive since an apparatus according to one embodiment of the invention may assume orientations other than those shown in the figures, in particular when in use.

FIG. 1. schematically shows a dataset 100 according to one exemplary embodiment of the invention. The dataset 100 was generated by means of a physical process that is associated with signals in rail transportation technology. A first label relates to a red signal, while a second label relates to a green signal. The dataset 100 has a plurality of first data points 101 assigned to the first label (here, black points) and a plurality of second data points 102 assigned to the second label (here, white points).

In other words, the dataset 100 comprises a number n of data points with simple labels (for example, red and green in the case of a problem with traffic light recognition). In this example, the problem space of the dataset 100 has two dimensions. It is assumed (or is plausible) that the first data points 101 and the second data points 102 are separable (assumption A1).

The dataset 100 is now to be evaluated in such a way that an error limit for the probability of misclassification is found. Such a misclassification would, for example, occur if a red point were classified as a green point.

It is furthermore assumed (or is plausible) that a limit line between the two sets (first and second data points) is sufficiently smooth, is measurable and has a finite length L. This excludes highly irregular shapes such as Mandelbrot sets (fractals) etc. (assumption A2).

Finally, it is assumed (or is plausible) that the data points 101, 102 cluster with the same label. In other words, there is a high probability that a data point with the same label will be located in the vicinity of a data point with a certain label. In one example, there is no data point with another label within a data points triangle with the same label. It is hence assumed that data points with the same label normally have neighbors with the same label (assumption A3). This is already implied by (A1) in theory, but is not always specified when recording the data. A3 implies that a sufficiently large and representative dataset is available.

FIG. 2 schematically shows a range of uncertainty U in the dataset 100 according to one exemplary embodiment of the invention. Assuming that the first and second data points are separated, there is no single optimal solution to the classification problem. However, there is a local area between cluster areas of first and second data points in which the classification is uncertain.

The example in FIG. 2 has a theoretical limit L which is known to exist (A1) and can be defined (A2). The aim is now to quantify this range of uncertainty U, for example to determine the area in the two-dimensional problem space. A corresponding hyperarea is then one-dimensional (a length). One approach would be to calculate the area, i.e., the length of the hyperarea L times the width w. According to A3, it is assumed that it is fairly unlikely that data points with different labels lie in the same cluster area. However, the distribution of the data points is uncertain.

Figure 3:
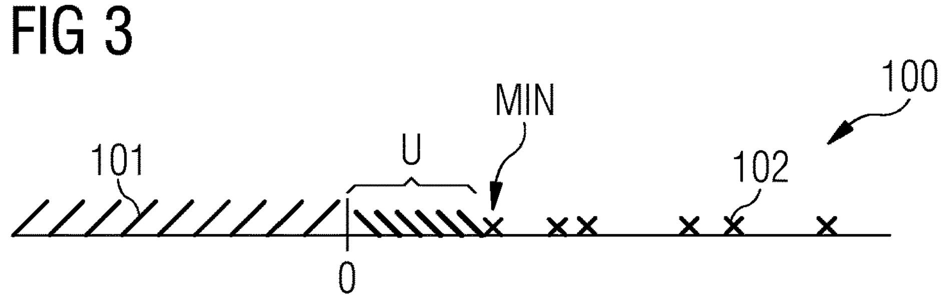
FIG. 3 schematically shows a range of uncertainty between a first cluster area and a second cluster area in a one-dimensional problem space according to one exemplary embodiment of the invention.

FIG. 3 schematically shows a range of uncertainty U in a one-dimensional problem space of the dataset 100 according to one exemplary embodiment of the invention. Between a first cluster area of first data points 101 (left side) and a second cluster area of second data points 102 (right side), there is a limit 0. Of interest in this one-dimensional example is the range of uncertainty U between the limit 0 and the second cluster area.

It is assumed that the second data points 102 have a positive iid distribution (iid: independent and identically distributed). Hence, the data points are independently and identically distributed as random variables (each random variable has the same probability distribution). Furthermore, it is assumed that the minimum of the random variables is an appropriate measure for w/2.

Exponential distribution: for exponential iid random variables with parameter λ, the minimum is exponentially distributed with parameter nλ, so that the mean value is 1/(nλ). A one-side percentile for a significance level of p can hence be determined as (1):

$$\frac{-\ln(1-p)}{n\lambda} \tag{1}$$

Hence, (1) quickly approaches zero at the rate n (instead of $\sqrt{n}$). The other parameters are constant.

Uniform distribution: for comparison, it can be assumed that the distribution of the data points is uniform for a specific interval. It can then be concluded that the minimum (1,n) is distributed and the mean value is 1/(n+1). The following percentile can be derived from this (2):

$$1-\sqrt[n]{(1-p)} \tag{2}$$

Although (2) differs significantly from (1), after a Taylor expansion a similar result can be obtained for small values of (1−p) as with (1).

General distributions: in general, the distribution of the minimum is not known, but it is known from extreme value theory that the limiting distribution for limited minimum problems is a Weibull distribution. This distribution depends on two parameters, wherein λ is a scaling and k is a shape parameter, for example k=1 gives an exponential distribution:

$$F(t)=1-e^{-(\lambda t)^k}$$

The percentiles of a Weibull distribution are given by:

$$\frac{\sqrt[k]{-\ln(1-p)}}{\lambda}$$

This appears similar to (1), but further assumptions regarding the shape of the distribution may be necessary.

However, since even the moments for the minimum of the N(0,1)-distribution do not have a closed shape solution, it can be difficult to obtain at least an approximate result for the expected minimum or the variance from the minimum of a general distribution.

However, the so-called probability integral transform can be helpful. It is known that any continuous probability distribution F can be generated from the uniform distribution by $X=F^{-1}(U)$. This is, for example, used to generate general random numbers in the Monte-Carlo simulation. It is known that this relationship applies to the order statistics and in particular to the minimum $X_{(1)}=F^{-1}(U_{(1)})$. Therefore, this can be applied if sets are to be calculated for a general distribution. For the uniform distribution, the exact quantile from (2) and a useful approximation of (1) are known.

The uniform percentile is denoted by $q_p$. The related percentile for the general case is then given as $F^{-1}(q_p)$. However, since $q_p$ tends toward zero as n increases, the behavior $F^{-1}$ near zero is particularly interesting. For a continuous positive distribution, a series expansion can be assumed: $F^{-1}(x)\approx ax$. If the distribution F covers the vicinity of zero, there should be no constant term. Then a is only given by the derivative $(F^{-1})'(0)$, which is equal to $1/F'(0)=1/f(0)$ if F has the probability density f. Finally, the following can be derived (3):

$$F^{-1}(q_P)=\frac{q_P}{f(0)} \tag{3}$$

Equation (3), however, means that even for general distributions the percentile is similar to (1), or that (1) already has the general form when λ is replaced by f(0). A comparison shows that (3) is meaningful, since f(0)=0 for an exponential distribution would mean that the expected value would be infinite. For the actual uniform distribution, f(0)=1 and so (3) is equal to (2).

In general, f(0)=0 only means that the probability mass near zero is small and that the series expansion is not justified so that the approximation cannot be used, but the inverse of F has to be determined directly. However, if more is known about the behavior of F or f in the vicinity of zero is known, it is perhaps possible to derive a more meaningful result for distributions with f(0)=0, either by a series expansion of F or by a more detailed examination of limit properties, for example by l'Hospital's rule.

But, for all distributions with f(0)≠0, (3) and (1) demonstrated that the rate of convergence is in the range 1/n instead of $1/\sqrt{n}$ (with statistical approaches). This in particular means that a significant improvement has occurred under the above assumptions. For example, much less training data is now required.

Figure 4:
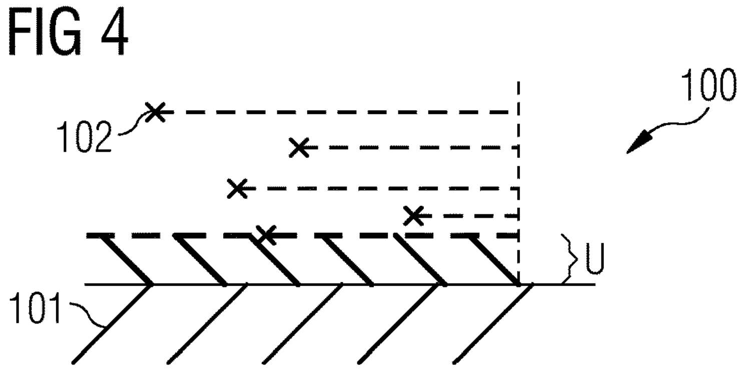
FIG. 4. schematically shows a range of uncertainty between a first cluster area and a second cluster area in a two-dimensional problem space according to one exemplary embodiment of the invention.

FIG. 4 schematically shows a range of uncertainty U in a two-dimensional problem space of the dataset 100 according to one exemplary embodiment of the invention. Compared to the example in FIG. 3, therefore, a further dimension is added, wherein once again only a range of uncertainty next to the limit 0 is examined. Assuming that the linear segment has a length L and w denotes an approximate percentile of the limiting distribution, Lw can be used as a local estimation of the range of uncertainty.

To extend the local estimation to the full problem, as depicted in FIG. 1, more assumptions may be necessary. First, it can be assumed that locally all limiting distributions are similar, not necessarily the same (A4). Then, as in the example in FIG. 2, it can be assumed that the area of the range of uncertainty is approximately Lw, wherein L is the length of the limiting curve. It can be questionable whether the range of uncertainty will be underestimated if all n data points are taken into account and the minimum of all data points is used.

Figure 5:
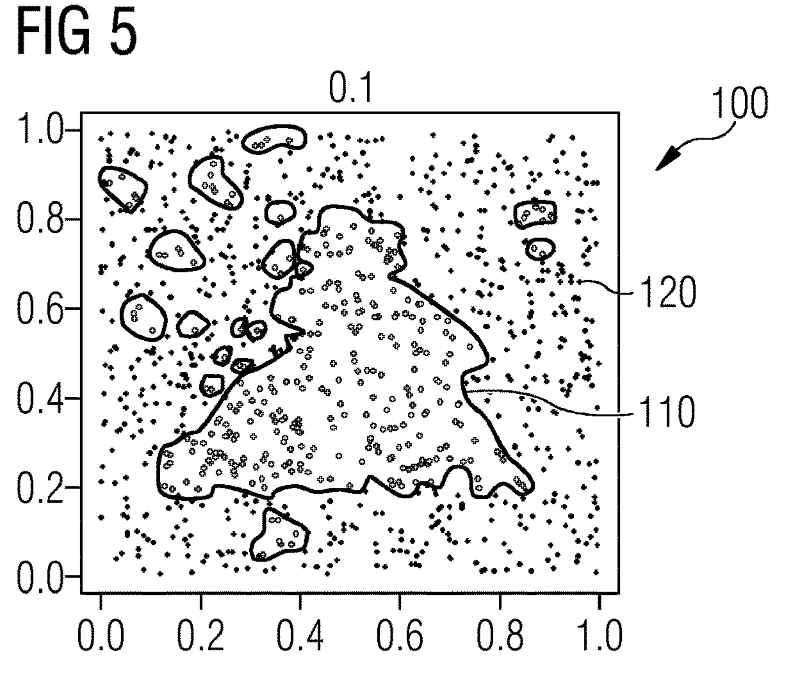
FIG. 5 schematically shows a plurality of range of uncertainties which in each case delimit a first cluster area, according to one exemplary embodiment of the invention.

FIG. 5 schematically shows a plurality of range of uncertainties, which in each case delimit a first cluster area 110 with first data points from an area 120 of second data points (with respect to the dataset 100 in FIG. 1). It can be assumed that the data points are identically and independently distributed and A4 is fulfilled. A1 to A3 also appear to be plausible so that the limiting curve can be estimated.

As in FIGS. 3 and 4, here once again only one side of the limiting curve can be of interest. One way to estimate the hyperarea (here the length L) can, for example be, by means of Delaunay triangulation (in particular automatically). Here, the data points are connected to form triangles, wherein two results are possible: all three corners of a triangle are assigned to the same label or one corner is assigned to a different label than the other two. Triangles with the same label are classified correctly, whereas the others are close to the limit. Based on the latter, L can be estimated (e.g. summation of the longest sides of these triangles).

Figure 6:
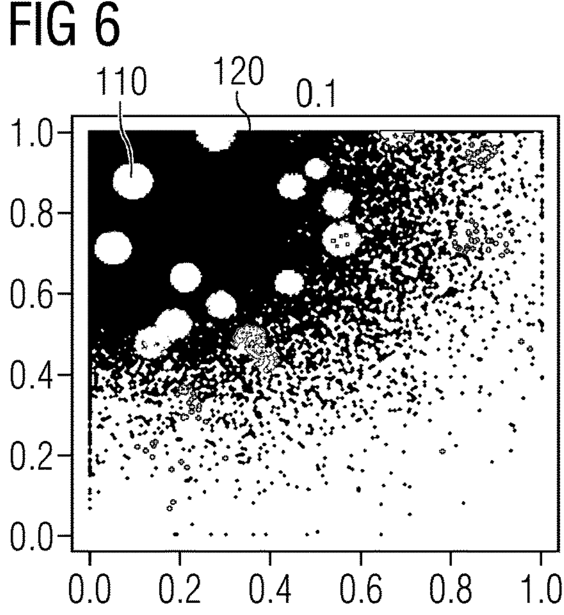
FIG. 6 shows a dataset with complex separation between the cluster areas according to one exemplary embodiment of the invention.

FIG. 6 shows a dataset 100 with complex cluster areas 110, 120, which may be challenging to separate, according to one exemplary embodiment of the invention. Compared to the dataset in FIG. 1, the dataset in FIG. 6 shows higher complexity and there is no homogeneous overall distribution.

Although it can be assumed that the distribution is normal, in reality it can be much more complex because there is actually a mixture of normal distributions that are truncated at the limit. Therefore, assumption A4 would no longer hold true.

Figure 7:
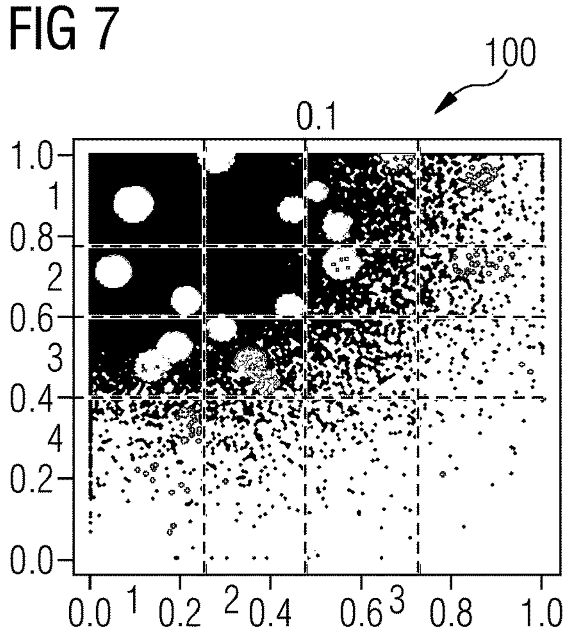
FIG. 7 shows a partitioning of the dataset in FIG. 6 according to one exemplary embodiment of the invention.

In order to tackle this higher complexity, the problem space can be partitioned. FIG. 7 shows a detailed view of FIG. 6, wherein a regular division into 16 subproblems is shown. This is by way of example, other types of partitioning, for example triangles, could be used instead.

It is known how many data points $n_{i,j}$ there are in each partition, so that it is possible to estimate the probability of a new data point falling into a partition:

$p_{i,j}=n_{i,j}/n$. Accordingly, the overall probability (overall result) m of a misclassification can first be determined for each partition, for example:

$$m=\sum_{i,j} p_{i,j} m_{i,j}$$

It can be assumed that the data items are representative of the true distribution, and partitionings with only one label can be sorted out, for example 3,4 or 3,3 in FIG. 7. For some partitionings, a simpler approach can be selected, for example 1,2 or 4,2, wherein for example 2,4 or 4,4 can be more challenging. Now, either more data can be acquired or it can be assumed that $m_{i,j}$ is 1 in this partitioning. If the number of data points in this partitioning is low, this can be a possibility. For example, n=10,000 first data points (label red) can be present in the dataset 100 in FIG. 6, but only one is localized in partitioning 4,4.

Assuming an equal limit distribution (in particular almost the same f(0) in all sub-datasets), the overall result can be simplified to (with uniform or equal distributions):

$$m=\sum_{i,j} p_{i,j} m_{i,j} \sim \frac{-\ln(1-p)}{f(0)n} \sum_{i,j} L_{i,j} = L\frac{-\ln(1-p)}{f(0)n}$$

Figure 8:
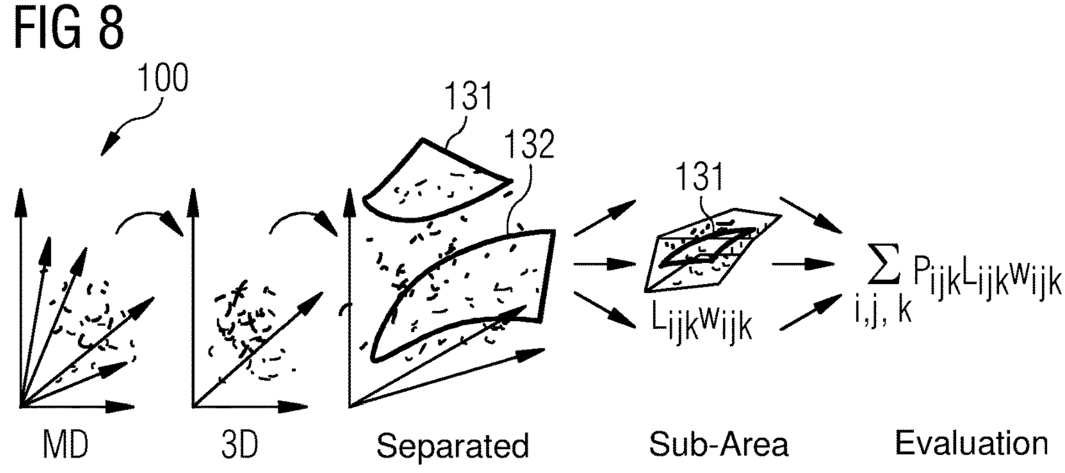
FIG. 8 schematically shows a reduction of the dimensionality and the separation of a sub-dataset according to one exemplary embodiment of the invention.

FIG. 8 schematically shows a reduction in the dimensionality and a separation of a sub-dataset according to one exemplary embodiment of the invention. The previous figures dealt with one-dimensional and two-dimensional problem spaces. However, the number of partitionings increases exponentially with the number of dimensions. Therefore, it can be advantageous to only consider the most important features and extract them, for example by means of principal component analysis. This can reduce the dimensionality.

In the example in FIG. 8, there are initially multiple dimensions (MD). These are reduced to three dimensions. Then, sub-datasets 131, 132 (or sub-spaces) are separated (or partitioned). Then, each sub-space (here 131) is considered separately, and m (see above) is determined. Finally, the overall result is evaluated by summarizing the results of the sub-spaces.

Reference is had to the fact that the term "comprising" does not exclude other elements or steps and the use of the article "a" does not exclude a plurality. Elements described in connection with different embodiments can also be combined. Reference is also made to the fact that reference symbols in the claims should not be construed as limiting the scope of the claims. Further, irrespective of the grammatical gender of specific terms, they also include individuals with male, female or other gender identities.

The invention claimed is:

1. A computer-implemented method comprising:
- performing a physical process and acquiring data from the physical process;
- creating a dataset based on the physical process;
- evaluating a probability of a misclassification of the dataset by the following steps:
  - providing the dataset, which includes:
    - a plurality of first data points configured to be assigned to a first label, wherein the first data points at least partially form at least one first local cluster area; and
    - a plurality of second data points configured to be assigned to a second label, wherein the second data points at least partially form at least one second local cluster area; and
  - wherein the first data points and the second data points are separable;
  - establishing a range of uncertainty between the first local cluster area of the first data points and the second local cluster area of the second data points;
  - evaluating the dataset based on the range of uncertainty by determining a limit range of the range of uncertainty based on a stochastic distribution; and executing the step of evaluating a probability of a misclassification of the dataset when the following assumptions hold true for the dataset or a transformation of the dataset was successful such that the following assumptions hold true:

the data points are separated in the m-dimensional space by (m−1) dimensional sets of hyperareas or hyperplanes, the hyperarea and/or the limit area of the hyperarea is definable or measurable and is finite, the data points that are configured to be assigned to a label cluster or form a local cluster area, and in the vicinity of the limit range of the hyperarea, the distribution of the data points is locally homogeneous.

2. The method according to claim 1, wherein the evaluating step comprises:

estimating a probability that a data point is assigned to an incorrect label.

3. The method according to claim 2, which comprises estimating the probability that one of the first data points is assigned to the second label and/or that one of the second data points is assigned to the first label.

4. The method according to claim 1, wherein the step of creating the range of uncertainty furthermore comprises determining a finite hyperarea of the range of uncertainty.

5. The method according to claim 4, wherein the step of determining the hyperarea comprises at least one of the following: Delaunay triangulation, limit search, maximum margin hyperplane.

6. The method according to claim 1 which comprises determining the limit range of the range of uncertainty based on the stochastic distribution by estimating a quantile of a minimum distance distribution.

7. The method according to claim 1, wherein the dataset originates from a rail transportation technology environment and related to at least one of a signal, an axle counter, a point mechanism.

8. The method according to claim 7, wherein the dataset originates from a light signal.

9. The method according to claim 1, wherein the dataset is selected from the group consisting of a data set with at least 100,000 data points, a data set with at least 500,000 data points, and a data set with at least 1,000,000 data points.

10. The method according to claim 1, wherein the problem space of the dataset is defined in a plurality of dimensions.

11. The method according to claim 10, wherein the problem space has three or more dimensions.

12. The method according to claim 1, which further comprises reducing the applied dimensions by way of a principal component analysis.

13. The method according to claim 1, which further comprises increasing the applied dimensions by transforming data.

14. The method according to claim 1, which further comprises:

separating at least one sub-dataset from the dataset, so that a distribution of the data points in a vicinity of the range of uncertainty is substantially locally homogeneous for the at least one sub-dataset.

15. The method according to claim 10, which further comprises merging an evaluation of at least two sub-datasets.

16. The method according to claim 1, wherein the evaluating step comprises determining whether the dataset fulfils a predetermined safety criterion.

17. The method according to claim 16, wherein the predetermined safety criterion is a safety criterion defined in the field of rail transportation technology.

18. A method, comprising:

performing a physical process;

creating a dataset, by way of an artificial intelligence (AI) algorithm, based on the physical process; and evaluating the dataset according to claim 1.

19. A data processing apparatus, comprising at least one processor and being configured to execute the method according to claim 1.

20. A non-transitory computer program product comprising computer-executable instructions which, when the program is executed by a computer, cause the computer to execute the method according to claim 1.

* * * * *